(12) United States Patent
Trangbaek et al.

(10) Patent No.: US 9,133,900 B2
(45) Date of Patent: Sep. 15, 2015

(54) METHOD AND APPARATUS FOR SUSPENSION DAMPING INCLUDING NEGATIVE STIFFNESS EMPLOYING A PERMANENT MAGNET

(71) Applicant: GM GLOBAL TECHNOLOGY OPERATIONS LLC, Detroit, MI (US)

(72) Inventors: Klaus Trangbaek, Herzliya Pituach (IL); Avshalom Suissa, Kiryat Ono (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/106,982

(22) Filed: Dec. 16, 2013

(65) Prior Publication Data

US 2015/0167770 A1    Jun. 18, 2015

(51) Int. Cl.
*F16F 6/00*    (2006.01)

(52) U.S. Cl.
CPC .............. *F16F 6/005* (2013.01); *B60G 2202/16* (2013.01); *B60G 2600/24* (2013.01); *F16F 2222/06* (2013.01)

(58) Field of Classification Search
CPC ....... F16F 6/005; F16F 2222/06; F16F 13/26; B60G 11/22; B60G 2202/16; B60G 2600/24
USPC ................... 280/5.5, 5.515; 188/267, 266.1; 267/140.14, 140.15
See application file for complete search history.

(56) References Cited

U.S. PATENT DOCUMENTS

| | | | | |
|---|---|---|---|---|
| 4,583,752 | A | * | 4/1986 | Breitbach ................... 280/6.157 |
| 4,949,573 | A | * | 8/1990 | Wolfe et al. ................. 73/117.03 |
| 4,969,662 | A |   | 11/1990 | Stuart |
| 5,251,729 | A | * | 10/1993 | Nehl et al. .................. 188/266.1 |
| 5,263,558 | A | * | 11/1993 | Yamaoka ....................... 188/267 |
| 6,290,035 | B1 |   | 9/2001 | Kazmirski et al. |
| 6,402,118 | B1 | * | 6/2002 | Nijsse et al. ................... 248/550 |
| 6,688,618 | B2 |   | 2/2004 | Schmidt et al. |
| 6,721,641 | B1 | * | 4/2004 | Denne ............................. 701/37 |
| 6,793,049 | B2 |   | 9/2004 | Kazmirski |
| 7,000,910 | B2 | * | 2/2006 | Oshimo ........................ 267/259 |
| 7,150,451 | B2 |   | 12/2006 | Soles et al. |
| 7,766,354 | B2 | * | 8/2010 | Ersoy et al. ............ 280/124.138 |
| 7,963,377 | B2 |   | 6/2011 | Quinn et al. |
| 8,185,269 | B2 |   | 5/2012 | Li et al. |
| 8,210,547 | B2 |   | 7/2012 | Rodenbeck |
| 8,575,804 | B2 |   | 11/2013 | Nakatsugawa |
| 2011/0297497 | A1 |   | 12/2011 | Kim |
| 2013/0087985 | A1 |   | 4/2013 | Marur |

\* cited by examiner

*Primary Examiner* — Drew Brown (57) ABSTRACT

A suspension assembly between a sprung element and an unsprung element includes a load-carrying spring element arranged in parallel with a negative stiffness element between the sprung element and the unsprung element. The negative stiffness element includes first and second opposed mutually-repelling elements.

9 Claims, 5 Drawing Sheets

METHOD AND APPARATUS FOR SUSPENSION DAMPING INCLUDING NEGATIVE STIFFNESS EMPLOYING A PERMANENT MAGNET

TECHNICAL FIELD

This disclosure relates to devices for damping vibration between a sprung element and an unsprung element.

BACKGROUND

The statements in this section merely provide background information related to the present disclosure. Accordingly, such statements are not intended to constitute an admission of prior art.

Suspension systems are employed to decouple a sprung element from impulse and vibration energy inputs that are experienced at an unsprung element by absorbing and dissipating vibration inputs. Suspension systems are employed on both stationary systems and mobile systems including passenger vehicles. Known suspension system elements include spring elements coupled in parallel and/or in series with damping elements, e.g., shock absorbers that include fluidic or pneumatic energy absorbing and dissipating features.

When employed on a vehicle system, suspension systems including springs and dampers are configured to coincidentally provide performance characteristics related to passenger ride comfort, vehicle handling and road holding capability. Ride comfort is generally managed in relation to spring constant of the main springs of the vehicle, spring constant of passenger seating, tires and a damping coefficient of the damper. For optimum ride comfort, a relatively low damping force or a soft ride is preferred. Vehicle handling relates to variation in a vehicle's attitude, which is defined in terms of roll, pitch and yaw. For optimum vehicle handling, relatively large damping forces for a firm ride are required to avoid excessively rapid variations in vehicle attitude during cornering, acceleration and deceleration. Road holding ability generally relates to an amount of contact between the tires and the ground. To optimize road handling ability, large damping forces are required when driving on irregular surfaces to prevent loss of contact between individual wheels and the ground. Known vehicle suspension dampers employ various methods to adjust damping characteristics to be responsive to changes in vehicle operational characteristics.

SUMMARY

A suspension assembly between a sprung element and an unsprung element includes a load-carrying spring element arranged in parallel with a negative stiffness element between the sprung element and the unsprung element. The negative stiffness element includes first and second opposed mutually-repelling elements.

BRIEF DESCRIPTION OF THE DRAWINGS

One or more embodiments will now be described, by way of example, with reference to the accompanying drawings, in which:

FIG. 2-1 illustrates the negative stiffness element, which is a structural element employing opposed permanent magnets inserted between hinge points of a suspension assembly, in accordance with the disclosure;

FIG. 2-2 is a side view of the negative stiffness element including a first permanent magnet assembly coaxial to a second permanent magnet assembly including magnetic polarities nominally referred to as north and south and force vectors, in accordance with the disclosure;

FIG. 2-3 is a top view of the negative stiffness element including a first permanent magnet assembly within an annular second permanent magnet assembly including an orientation of the north and south magnetic poles of the first permanent magnet assembly aligned with the corresponding north and south magnetic poles of the annular second permanent magnet assembly, in accordance with the disclosure;

FIG. 2-4 is a top view of the negative stiffness element including the first permanent magnet assembly within the annular second permanent magnet assembly including an orientation of the north and south magnetic poles of the first permanent magnet assembly orthogonal to the north and south magnetic poles of the second permanent magnet assembly, in accordance with the disclosure;

FIG. 4-1 illustrates an embodiment of the negative stiffness element including the first permanent magnet assembly coaxial to the second permanent magnet assembly including a controllable electric motor configured to selectively disable the negative stiffness function in accordance with the disclosure;

FIG. 4-2 illustrates another embodiment of the negative stiffness element including the first permanent magnet assembly coaxial to the second permanent magnet assembly including a moveable shield configured to selectively disable the negative stiffness function thereof, in accordance with the disclosure;

FIG. 7-1 illustrates a cross-sectional view of a first embodiment of a negative stiffness element including opposed permanent magnets configured to interact with an anti-roll bar, in accordance with the disclosure;

FIG. 7-2 illustrates a cross-sectional view of a second embodiment of a negative stiffness element including opposed permanent magnets configured to interact with an anti-roll bar, in accordance with the disclosure.

DETAILED DESCRIPTION

Figure 1:
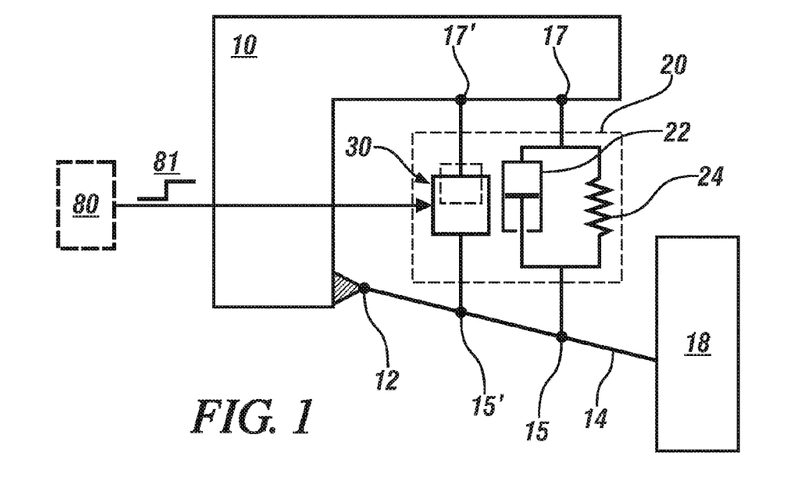
FIG. 1 illustrates a suspension assembly including a negative stiffness element that is employed to dampen vibration between a sprung element and an unsprung element, in accordance with the disclosure.

Referring now to the drawings, wherein the showings are for the purpose of illustrating certain exemplary embodiments only and not for the purpose of limiting the same, FIG. 1 schematically illustrates a suspension assembly 20 including a negative stiffness element 30 that is employed to dampen vibration between a sprung element 10 and an unsprung element 18. The negative stiffness element 30 includes first and second opposed mutually-repelling elements. The first and second opposed mutually-repelling elements are opposed permanent magnets in one embodiment. The terms spring rate, spring constant and stiffness are analogous terms that all refer to a change in force exerted by a spring in relation to the deflection of the spring throughout this description.

The sprung element is a body 10 of a vehicle and the unsprung element includes a lower control arm 14 supporting a wheel assembly 18 that contacts a ground surface. The lower control arm 14 attaches to the body 10 at hinge point 12 and works in concert with an upper control arm to provide seating elements for mounting the wheel assembly 18. Details for mounting a vehicle wheel assembly 18 are known and thus not described herein. The suspension assembly 20 may be employed to dampen vibration between a sprung element and an unsprung element in a stationary setting with similar effect. The suspension assembly 20 incorporates the negative stiffness element 30 to maintain preferred performance while accommodating static and dynamic load changes, including supporting a large load and providing a low dynamic stiffness for vibration isolation. This enables reduction of the total spring rate to at or near zero while maintaining static load carrying capability. Such systems effect preferred ride for passenger comfort and wheel/tire road grip for safety while having sensitivity to static load changes due to mass changes and dynamic load changes during vehicle handling maneuvers. In one embodiment, a controller 80 is configured to activate and deactivate the negative stiffness element 30 employing a control signal 81. Alternatively, the negative stiffness element 30 is a self-actuated system without need for deactivation, i.e., a passive system and thus no controller is employed to activate and deactivate the system.

The suspension assembly 20 is a load-carrying element that supports and transfers static and dynamic forces and load inputs between the unsprung element 14 and the sprung element 10, i.e., the lower control arm 14 and the body 10. The suspension assembly 20 in the embodiment shown includes a spring 24, a damper 22, and negative stiffness element 30 arranged in parallel between the lower control arm 14 and the body 10. As shown, the spring 24 and damper 22 co-terminate on the lower control arm 14 at hinge point 15 and co-terminate on the body at hinge point 17. The negative stiffness element 30 terminates on the lower control arm 14 at hinge point 15' and terminates on the body at hinge point 17'. As shown and in one embodiment, the hinge point 15 and the hinge point 15' are different points, resulting in different moment arms for the forces exerted by the different elements. Alternatively, the hinge point 15 and the hinge point 15' are the same point. Similarly, as shown and in one embodiment, the hinge point 17 and the hinge point 17' are different points. Alternatively, the hinge point 17 and the hinge point 17' are the same point. In one embodiment, the suspension assembly 20 may be a passive suspension system, which is defined as a suspension system that has no external control elements controlling operation of suspension devices, i.e., the spring 24, damper 22 and negative stiffness element 30. The spring 24 and damper 22 are illustrated as mechanical devices, but may be configured as any suitable spring and damper devices, including by way of example, pneumatic devices, hydraulic devices, mechanical devices and combinations thereof. The spring 24, damper 22 and negative stiffness element 30 dampen and otherwise accommodate vibrations input to the unsprung element 14, e.g., the lower control arm 14 supporting the vehicle wheel assembly 18 in contact with the ground surface while the vehicle is moving and while the vehicle is stationary. The suspension system 20 is configured to statically support a large load with a low dynamic stiffness that effects vibration isolation. Preferably the total spring rate of the combined elements of the suspension system 20 is at or near zero under static conditions responsive to variations in static vehicle loading and is responsive to dynamic load changes associated with vehicle handling, cornering and rough road conditions.

The function of the negative stiffness element 30 is to introduce a force in the suspension assembly 20 between the sprung element 10 and the unsprung element 14 that is counter to the force introduced by the spring 24, e.g., into the suspension of the vehicle under static conditions. The counter force of the negative stiffness element 30 assists in separating the sprung element 10 and the unsprung element 14, so long as the force acting on the sprung element 10 is less than a yield force of the negative stiffness element 30 taking into account any differences in the moment arms of the relevant elements. The negative stiffness element 30 provides a force that is counter to the spring force of the spring 24, preferably having negative spring rate at a magnitude that cancels the positive spring rate of spring 24 at a zero deflection point of the suspension assembly 20 under static loading.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, example each 100 microseconds, 3.125, 6.25, 12.5, 25 and 100 milliseconds during ongoing vehicle operation. Alternatively, routines may be executed in response to occurrence of an event.

Figure 21:
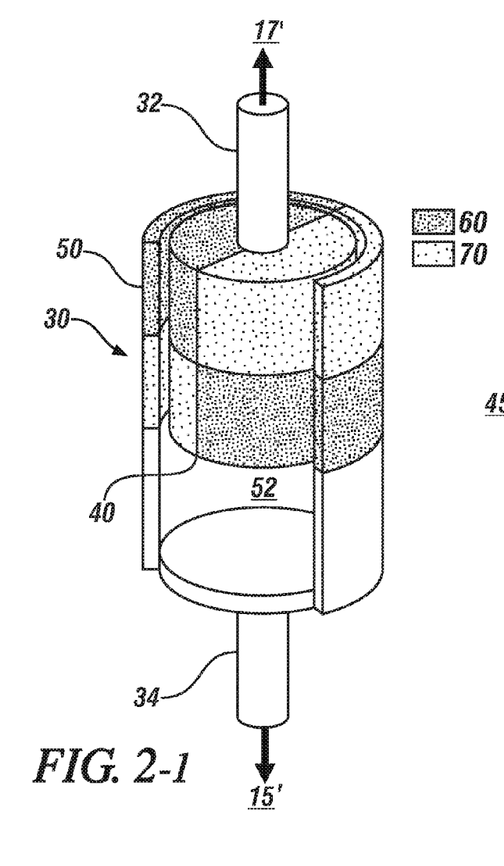

FIG. 2-1 shows details of an embodiment of the negative stiffness element 30, which is a linear structural element that can be inserted between hinge points 15' and 17' of suspension assembly 20 shown with reference to FIG. 1 to provide negative stiffness functionality thereto. The negative stiffness element 30 is fabricated using first and second opposed permanent magnet assemblies that are configurable to a first position in a mutually repelling state and configurable to a second position with the opposed permanent magnets in a non-mutually repelling state. The negative stiffness element 30 includes a first shaft member 32 that couples to hinge point 17' and a second shaft member 34 that couples to hinge point 15'. The opposed permanent magnet assemblies include a first permanent magnet assembly 40 configured as a cylindrically shaped plunger coaxial to a second permanent magnet assembly 50 configured as a coaxial annular tube. An open area 52 may be provided at the bottom of the second permanent magnet assembly 50. Magnetic polarities nominally referred to as north 60 and south 70 are shown for each of the opposed permanent magnets. The first permanent magnet assembly 40 includes one or a plurality of permanent magnets that are formed in the shape of a cylinder and attached to an end of the first shaft member 32. As shown, the first permanent magnet assembly 40 includes upper and lower permanent magnets that are assembled in a stack with the magnetic polarities reversed between the upper and lower permanent magnets. The upper and lower permanent magnets may be configured as annularly-shaped elements that are located on the outer portion of the first permanent magnet assembly 40, with an inner portion preferably fabricated from a structural material other than a permanent magnet, including by way of example iron or steel. The second permanent magnet assembly 50 has a cylindrical shape that is annular to the first permanent magnet assembly 40 and is shown in cutaway fashion. The second permanent magnet assembly 50 includes upper and lower permanent magnets that are assembled in a stack with the magnetic polarities reversed between the upper and lower permanent magnets. The longitudinal lengths of the upper and lower permanent magnets of the first permanent magnet assembly 40 correlate to the longitudinal lengths of the upper and lower permanent magnets of the second permanent magnet assembly 50. The magnet and magnetic pole configurations shown in FIG. 2-1 are illustrative of one embodiment. Other suitable magnet and magnetic pole configurations may be applied with similar results and thus are within the scope of the disclosure.

Figure 22:
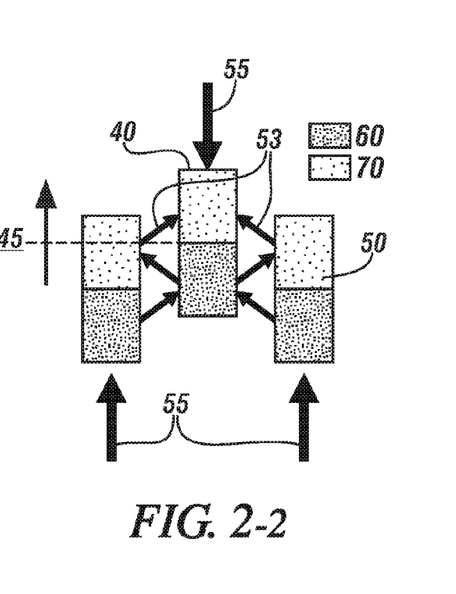

FIG. 2-2 is a side view of the negative stiffness element 30 including the first permanent magnet assembly 40 coaxial to second permanent magnet assembly 50 including the magnetic polarities nominally referred to as north 60 and south 70. Force vectors are shown including compressive force 55 and repelling magnetic forces 53 acting between the respective north magnetic poles 60 of the adjacent permanent magnet assemblies 40 and 50 and between the respective south magnetic poles 70 of the adjacent permanent magnet assemblies 40 and 50. By way of reference, a magnetic element having a mass of 1 kg is able to generate a repelling force of 3000 N, which can be used in designing appropriate sizes and configurations for the opposed permanent magnet assemblies 40 and 50 to effect desired negative stiffness function.

Figure 23:
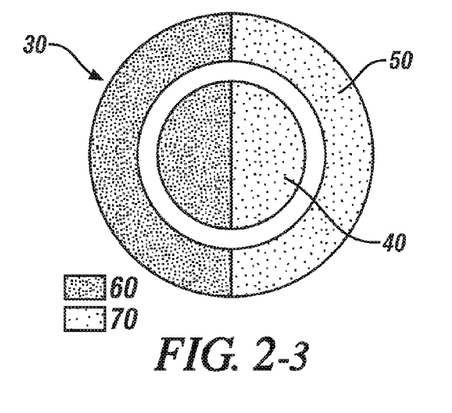

FIG. 2-3 shows a first top view of the negative stiffness element 30 including the first permanent magnet assembly 40 within the annular second permanent magnet assembly 50. As shown the orientation of the north and south magnetic poles 60, 70 of the first permanent magnet assembly 40 are aligned with the corresponding north and south magnetic poles 60, 70 of the annular second permanent magnet assembly 50, thus engaging the negative stiffness element 30 by arranging the corresponding magnets in mutually repelling states.

Figure 24:
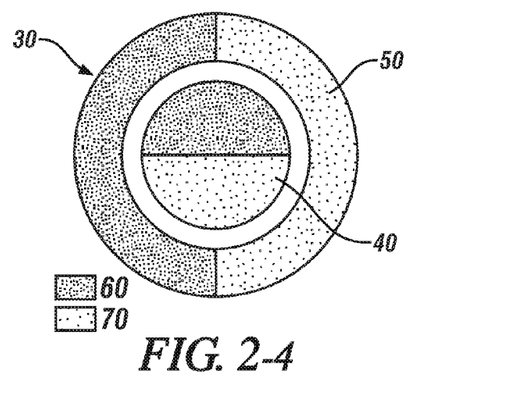

FIG. 2-4 shows a second top view of the negative stiffness element 30 including the first permanent magnet assembly 40 within the annular second permanent magnet assembly 50. As shown the orientation of the north and south magnetic poles 60, 70 of the first permanent magnet assembly 40 are orthogonal to the north and south magnetic poles 60, 70 of the second permanent magnet assembly 50, thus disengaging the negative stiffness element 30 by arranging the corresponding magnets in a neutral state.

Figure 3:
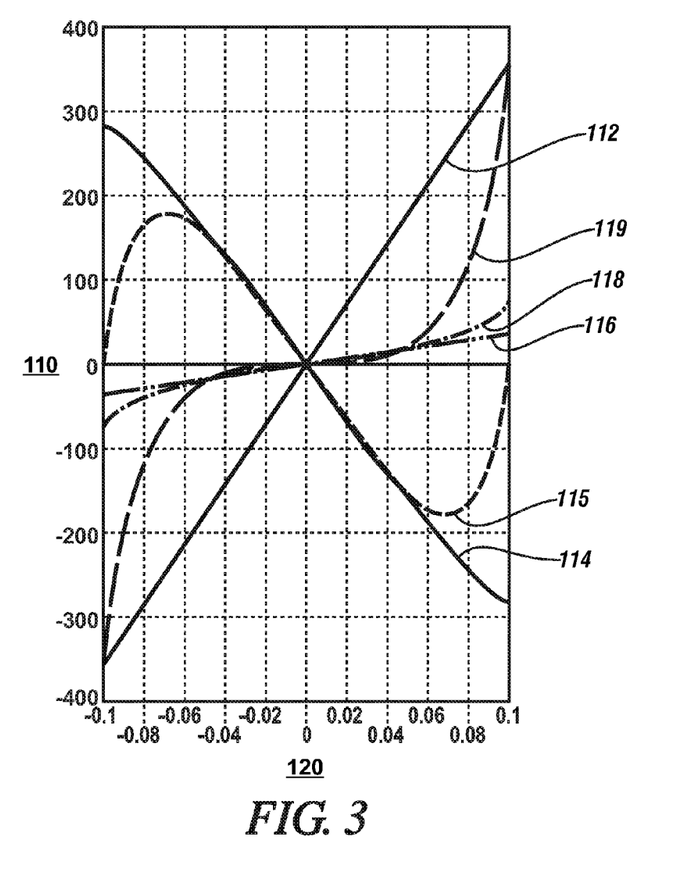
FIG. 3 illustrates deflection (m, travel) on a horizontal axis and load (N) on a vertical axis for suspension components including a spring and a negative stiffness element, in accordance with the disclosure.

FIG. 3 graphically shows deflection (m, travel) on a horizontal axis 120 and load (N) on a vertical axis 110 for suspension components including a spring and a negative stiffness element, with the deflection occurring between a sprung element and an unsprung element. A positive spring force for a suspension spring is shown on line 112 without a static load carrying component, and depicts a linear relation k between the deflection and the load. Line 116 depicts an idealized deflection in relation to load for a suspension system to achieve a force exerted between the sprung element and the unsprung element that is substantially constant regardless of the displacement, thus achieving a substantially constant force on the sprung element, e.g., a vehicle body, regardless of the force exerted on the unsprung element, e.g., a wheel. A negative stiffness element provides a force that is counter to the spring force 112. A negative stiffness element having a linear displacement is shown at line 114 along with a negative stiffness element having a non-linear displacement, shown at line 115. Line 118 graphically shows deflection for a system that combines the spring constant for the suspension spring shown on line 112 and the negative stiffness element having linear displacement shown at line 114. Line 119 graphically shows deflection for a system that combines the spring constant for the suspension spring shown on line 112 and the negative stiffness element having non-linear displacement shown at line 115. The performance shown at line 119 including deflection for a system that combines the spring constant for the suspension spring shown on line 112 and the negative stiffness element having non-linear displacement achieves a result that include low/zero spring stiffness at low deflections, with increasing stiffness at greater deflections. Such spring performance achieves preferred performance characteristics related to passenger ride comfort, vehicle handling and road holding capability, including a soft spring (small spring rate K) to achieve suitable isolation and therefore an operator-perceived comfortable ride in combination with a hard spring (large spring rate K) to reduce roll and pitch angles associated with steering and braking/accelerating maneuvers.

A negative stiffness element having linear displacement across its entire range provides improved ride performance as compared to a negative stiffness element having non-linear displacement. Using a negative stiffness element having a non-linear displacement may eliminate a need to actively engage and disengage the negative stiffness element during a driving maneuver. There may still be a preference to configure the negative stiffness element to be engaged and disengaged for vehicle parking and/or for a fail-safe operation.

Figure 41:
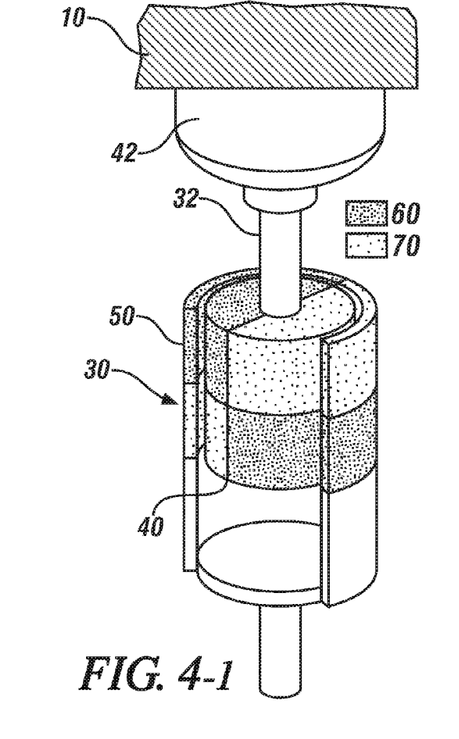

FIG. 4-1 shows an embodiment of the negative stiffness element 30 including the first permanent magnet assembly 40 coaxial to the second permanent magnet assembly 50 and including an embodiment of a controllable mechanism to selectively disable the negative stiffness function thereof. The controllable mechanism is an electric motor 42 that rotatably couples to the first shaft member 32 to rotate the orientation of the first permanent magnet assembly 40 relative to the second permanent magnet assembly 50. When the electric motor 42 controls the first permanent magnet assembly 40 to a first position in response to a command signal, e.g., as shown with reference to FIG. 2-3, the negative stiffness element 30 is engaged by arranging the respective magnets in a mutually repelling state. When the electric motor 42 controls the first permanent magnet assembly 40 to a second position in response to a command signal, e.g., as shown with reference to FIG. 2-4, the negative stiffness element 30 is disengaged by arranging the respective magnets in a neutral state.

Figure 42:
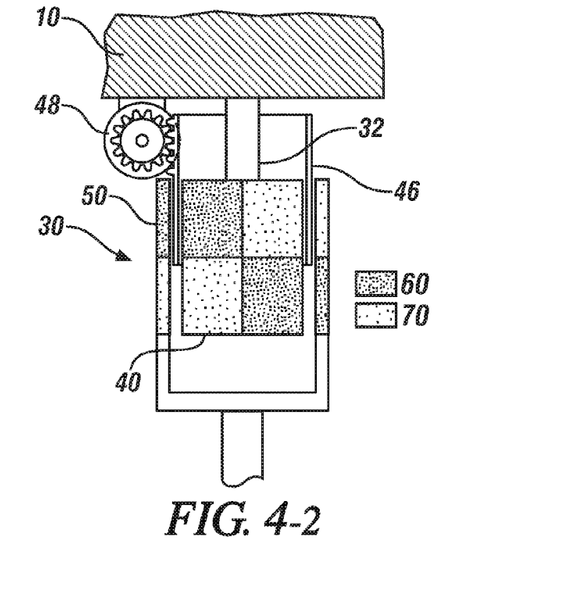

FIG. 4-2 shows another embodiment of the negative stiffness element 30 including the first permanent magnet assembly 40 coaxial to the second permanent magnet assembly 50 and including a second embodiment of a controllable mechanism to selectively disable the negative stiffness function thereof. The second embodiment of the controllable mechanism includes a shield 46 that can be selectively inserted into an air space between the first permanent magnet assembly 40 and the second permanent magnet assembly 50 by action of an electric gear motor 48. The shield may be fabricated from any suitable material, including by way of example iron or steel. The electric gear motor 48 is controllable to rotate in either a clockwise or a counterclockwise direction of rotation in response to a command signal, with the operation of the gear motor 48 interacting with the shield 46 in a suitable form, such as a rack and pinion configuration.

Figure 5:
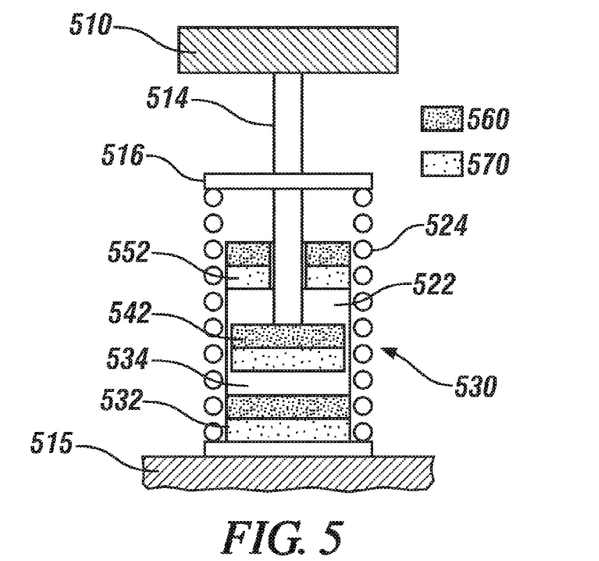
FIG. 5 illustrates an suspension device for a stationary system that is configured to dampen vibration between a sprung element and an unsprung element employing an integrated spring, damper and negative stiffness element, wherein the negative stiffness element employs opposed permanent magnets, in accordance with the disclosure.

FIG. 5 shows an embodiment of an integrated suspension device 520 that is configured to dampen vibration between a sprung element 510 and an unsprung element 515 employing an integrated spring 524, damper 522 and negative stiffness element 530, wherein the negative stiffness element 530 employs permanent magnets including south polarities 560 and north polarities 570 to effect the negative stiffness function. This configuration is depicted as a stationary system with the unsprung element 515 as ground, although it can function in a mobile system with similar effect. A damper chamber 534 is formed between an end member 552 and a first end member 532. Shaft member 514 couples to the sprung member 510, fixedly couples to a first flange 516, passes through end member 552 of the closed damper chamber 534 and fixedly couples to a plunger element 542 contained within the damper chamber 534. The damper chamber 534 is filled with fluid, and the plunger element 542 includes suitable fluidic valving to effect damping. Thus, movement of the sprung element 510 directly transfers to the first flange 516 and the plunger element 542, which dampens motion by restricting flow between sub-chambers of the damper chamber 534. The spring 524 is located between the unsprung element 515 and the first flange 516, preferably under a compressive load from the sprung element 510. The first end member 532, the second end member 552, and the plunger 542 are equipped with permanent magnets including south polarities 560 and north polarities 570. The north and south polarities 560, 570 are oriented as shown in FIG. 5, in one embodiment. The south polarities 560 and north polarities 570 of the permanent magnets are configured to counteract motion of the spring 524 when the sprung element 510 is moving in either a nominally upward direction or a nominally downward direction.

Figure 6:
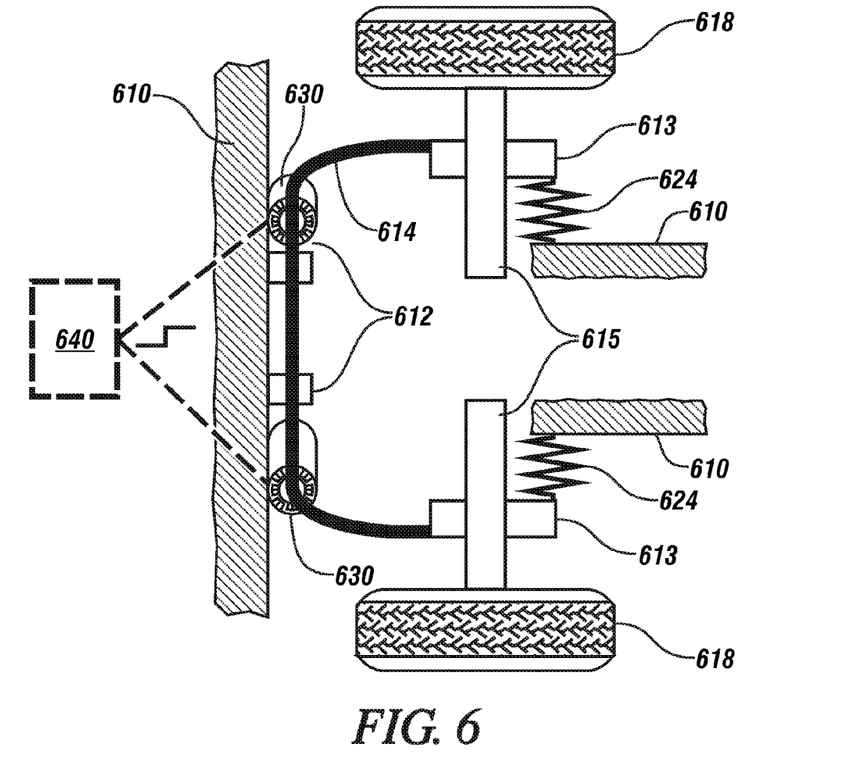
FIG. 6 illustrates an anti-roll bar that employs negative stiffness elements including opposed permanent magnets to dampen vibration between a vehicle body and a vehicle wheel, in accordance with the disclosure.

FIG. 6 shows an embodiment of an anti-roll bar 614 that employs negative stiffness elements 630 to dampen vibration between a sprung element, i.e., a vehicle body 610 and an unsprung element, i.e., a vehicle wheel 618. The negative stiffness element 630 employs opposed permanent magnets. The wheels 618 mount on axle shafts 615 that couple to brackets 613 that couple to the vehicle body 610 using springs 612. The anti-roll bar 614 is a U-shaped device having a first portion that mounts to the body 610 at brackets 612 and arm portions that couple to each of brackets 613. The anti-roll bar 614 is preferably configured with the first portion fabricated from steel or another suitable material having a high stiffness and the arm portions fabricated from steel or another suitable material having a low stiffness. The negative stiffness elements 630 mount on the body 610 and operatively couple to the anti-roll bar 614 on the first portion near the junctions with the arm portions. In one embodiment, a controller 640 can activate and deactivate the negative stiffness elements 630, including activating the negative stiffness function during vehicle operation such as during rough road operation and deactivating the negative stiffness elements 630 during vehicle cornering maneuvers. The negative stiffness elements 630 induce moments on the anti-roll bar 614 that transfer to the wheels 618. During vehicle cornering maneuvers, the negative stiffness elements 630 are deactivated and thus do not interfere with the function of the anti-roll bar 614.

Figure 8:
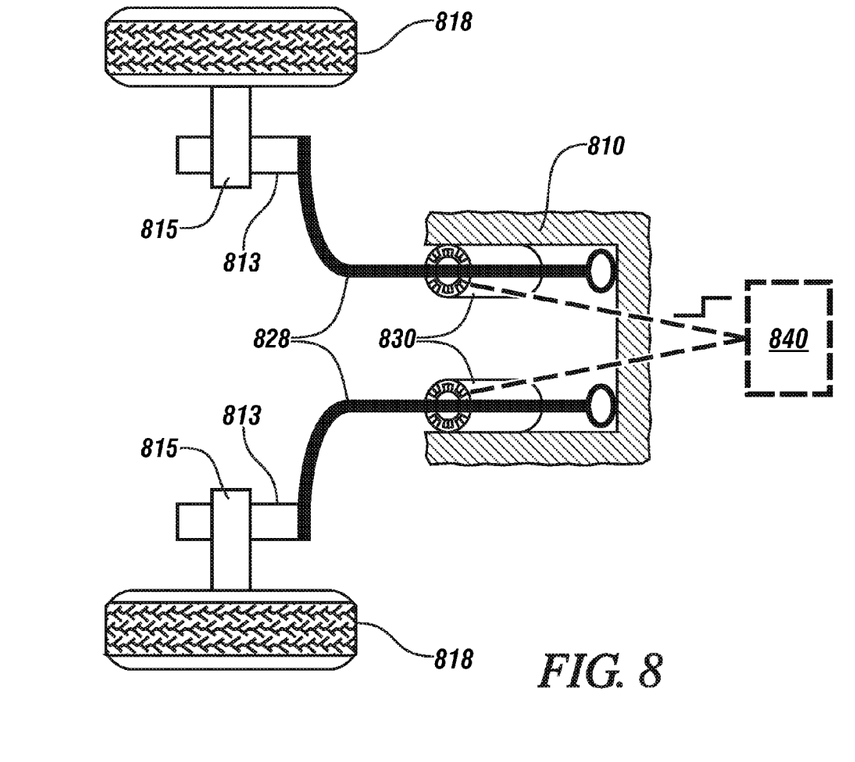
FIG. 8 illustrates a suspension configuration that includes a torsion bar coupled to a vehicle wheel, the torsion bar including a negative stiffness element employing opposed permanent magnets, in accordance with the disclosure.
Figure 71:
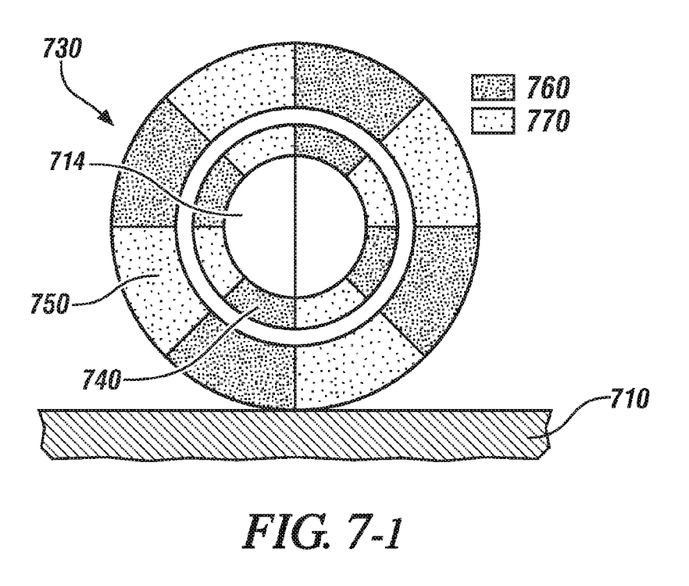
Figure 72:
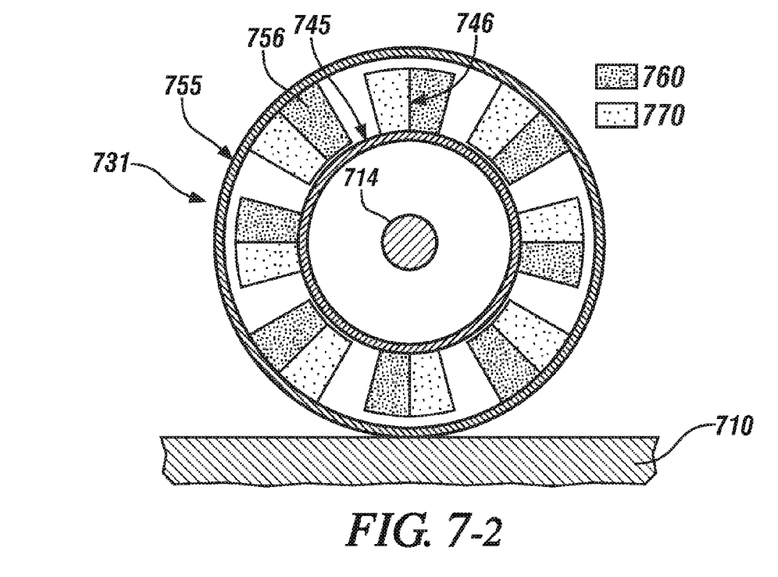

FIG. 8 shows a suspension configuration that includes a torsion bar 828 coupled to a vehicle wheel 818 via a bracket 813 and an axle section 815. The torsion bar 828 couples to the vehicle body 810 via a hinge element. A negative stiffness element 830 employing opposed permanent magnets couples to the body 810 and acts on the torsion bar 828. The torsion bar 828 is preferably configured with a first portion fabricated from steel or another suitable material having a high stiffness and an arm portion fabricated from steel or another suitable material having a low stiffness. The first portion couples to the vehicle body 810 and the arm portion couples to the bracket 813. Embodiments of configurations of the negative stiffness element 830 interacting with the torsion bar 828 are shown with reference to FIGS. 7-1 and 7-2. The negative stiffness element 830 effects the negative stiffness function during vehicle operation such as during rough road operation. The negative stiffness elements 830 induce moments on the torsion bar 828 that transfer to the wheels 818. The negative stiffness elements 830 are inactive, i.e., provide no contribution during vehicle cornering and other maneuvers that exert torsion on the rear wheels. During vehicle cornering maneuvers, the negative stiffness elements 830 are inactive and thus do not interfere with the function of the torsion bar 828.

FIG. 7-1 shows a cross-sectional view of a first embodiment of a negative stiffness element 730 configured to interact with either anti-roll bar 714, as shown, or the torsion bar 828 shown with reference to FIG. 8. The negative stiffness element 730 includes an outer annular ring portion 750 that fixedly couples to the vehicle body 710. The outer annular ring 750 includes a plurality of circumferentially placed permanent magnets including south polarities 760 and north polarities 770. The anti-roll bar 714 has a corresponding plurality of circumferentially placed opposed permanent magnets 740 including south polarities 760 and north polarities 770. The poles of the permanent magnets of the outer annular ring portion 750 are configured to oppose the corresponding poles of the permanent magnets of the circumferentially placed opposed permanent magnets 740 such that south polarities 760 oppose south polarities 760 and north polarities 770 oppose north polarities 770. Thus, the negative stiffness element 730 exerts a twisting force or torque to induce a moment on the anti-roll bar 714 as a result of the mutual repelling forces of the opposed magnets.

FIG. 7-2 shows a cross-sectional view of a second embodiment of a negative stiffness element 731 configured to interact with an anti-roll bar 714. The negative stiffness element 731 includes an outer annular ring portion 750 coupled to the vehicle body 710. The outer annular ring 750 includes a plurality of circumferentially placed inwardly projecting permanent magnets 756 including south polarities 760 and north polarities 770. The anti-roll bar 614 has a corresponding plurality of circumferentially placed outwardly projecting permanent magnets 746 including south polarities 760 and north polarities 770. The circumferentially placed outwardly projecting permanent magnets 746 are interspaced with the inwardly projecting permanent magnets 756 such that the south polarities 760 of the outwardly projecting permanent magnets 746 face the north polarities 770 of the inwardly projecting permanent magnets 756, and vice versa. Thus, the negative stiffness element 731 exerts a twisting force or torque to induce a moment on the anti-roll bar 714 as a result of the mutual repelling forces of the opposed magnets.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A suspension assembly between a sprung element and an unsprung element, comprising:
   a load-carrying spring element arranged in parallel with a negative stiffness element between the sprung element and the unsprung element, said negative stiffness element comprising:
      a first set of two magnets forming an inner cylinder, each magnet forming half of the inner cylinder though a 180 degree cross-section, the magnets being arranged in opposite polarity to each other;
      a second set of two magnets forming an outer hollow cylinder, each magnet forming half of the outer hollow cylinder though a 180 degree cross-section, the magnets being arranged in opposite polarity to each other, the outer hollow cylinder comprising an inner diameter configured to receive the inner cylinder; and
      a motor device controlling rotation of the inner cylinder in relation to the outer cylinder to selectively change or disable a force provided by the negative stiffness element.

2. The suspension assembly of claim 1, further comprising a moveable shield insertable between the two sets of magnets.

3. The suspension assembly of claim 1, further comprising a hydraulic damper arranged in parallel with the negative stiffness element.

4. A suspension assembly between a vehicle body and a ground contact wheel, comprising:
   a load-carrying spring element arranged in parallel with a negative stiffness element between the body and the wheel, said negative stiffness element comprising:
      a first set of two magnets forming an inner cylinder, each magnet forming half of the inner cylinder though a 180 degree cross-section, the magnets being arranged in opposite polarity to each other;
      a second set of two magnets forming an outer hollow cylinder, each magnet forming half of the outer hollow cylinder though a 180 degree cross-section, the magnets being arranged in opposite polarity to each other, the outer hollow cylinder comprising an inner diameter configured to receive the inner cylinder; and
      a motor device controlling rotation of the inner cylinder in relation to the outer cylinder to selectively change or disable a force provided by the negative stiffness element;
   wherein said sets of magnets are configured to provide a force counter to the load-carrying spring element.

5. The suspension assembly of claim 4, wherein the sets of magnets provide a force counter to the load-carrying spring element to achieve zero deflection of the suspension system under static loading.

6. The suspension assembly of claim 5, further comprising a moveable shield insertable between the two sets of magnets.

7. The suspension assembly of claim 4, further comprising a hydraulic damper arranged in parallel with the negative stiffness element.

8. A suspension system for a body of a vehicle, comprising:
   an anti-roll bar configured between the body and vehicle wheels, said anti-roll bar comprising a negative stiffness element configured to induce a moment on the anti-roll bar opposing a force induced by the body through suspension springs coupled to the vehicle wheels under steady-state operation, said negative stiffness element comprising:
      a first set of two magnets forming an inner cylinder, each magnet forming half of the inner cylinder though a 180 degree cross-section, the magnets being arranged in opposite polarity to each other;
      a second set of two magnets forming an outer hollow cylinder, each magnet forming half of the outer hollow cylinder though a 180 degree cross-section, the magnets being arranged in opposite polarity to each other, the outer hollow cylinder comprising an inner diameter configured to receive the inner cylinder; and
      a motor device controlling rotation of the inner cylinder in relation to the outer cylinder to selectively change or disable a force provided by the negative stiffness element;
   wherein the negative stiffness element is configured to induce said moment on the anti-roll bar.

9. A suspension system for a vehicle body, comprising:
   a torsion bar configured between the body and one of the vehicle wheels, said torsion bar comprising negative stiffness element configured to induce a moment on the torsion bar opposing a force induced by the body on the torsion bar, said negative stiffness element of the torsion bar comprising:
      a first set of two magnets forming an inner cylinder, each magnet forming half of the inner cylinder though a 180 degree cross-section, the magnets being arranged in opposite polarity to each other;
      a second set of two magnets forming an outer hollow cylinder, each magnet forming half of the outer hollow cylinder though a 180 degree cross-section, the magnets being arranged in opposite polarity to each other, the outer hollow cylinder comprising an inner diameter configured to receive the inner cylinder; and
      a motor device controlling rotation of the inner cylinder in relation to the outer cylinder to selectively change or disable a force provided by the negative stiffness element.

* * * * *